G. F. LYNDE.
TRAP.
APPLICATION FILED OCT. 4, 1920.
1,407,697.
Patented Feb. 28, 1922.
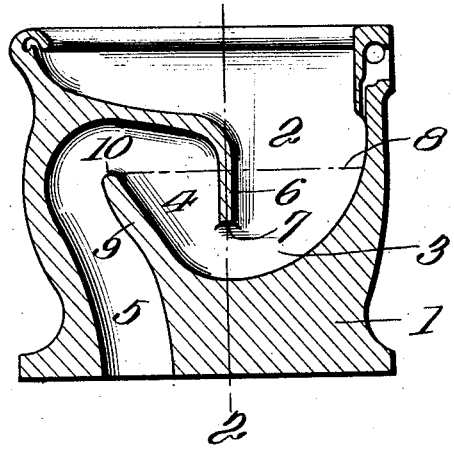
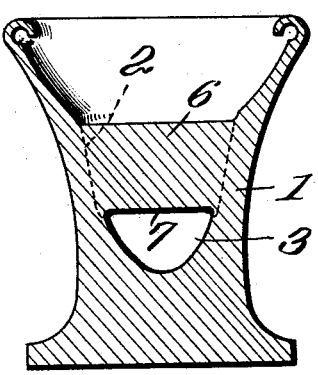
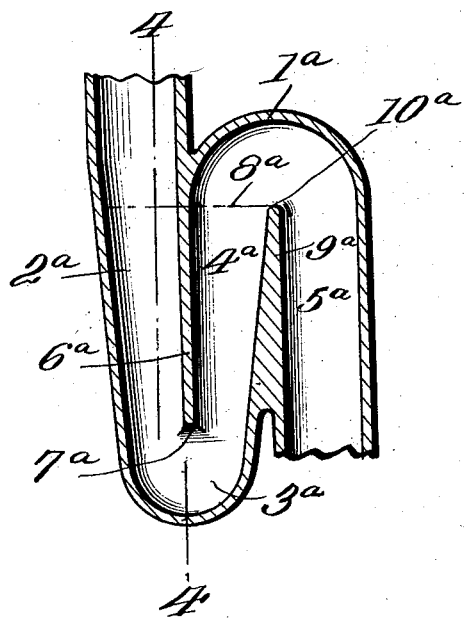
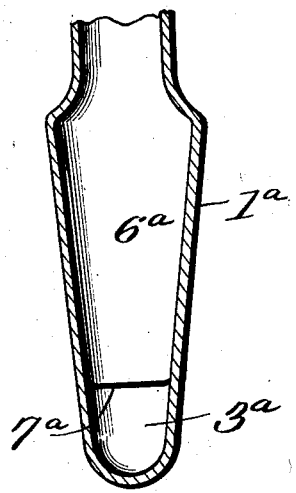
Inventor
GEORGE F. LYNDE.
By R. E. Barry
Attorney

UNITED STATES PATENT OFFICE.

GEORGE FRANCIS LYNDE, OF CHATTANOOGA, TENNESSEE.

TRAP.

1,407,697. Specification of Letters Patent. Patented Feb. 28, 1922.

Application filed October 4, 1920. Serial No. 414,576.

*To all whom it may concern:*

Be it known that I, GEORGE F. LYNDE, a citizen of the United States, residing at Chattanooga, in the county of Hamilton and State of Tennessee, have invented certain new and useful Improvements in Traps, of which the following is a specification.

This invention relates to improvements in water sealed traps particularly adapted for closets and sinks. It is a well known fact that water sealed traps now in general use, are subjected to fractures or ruptures when the water freezes in the trap. The traps as heretofore constructed are not designed to permit expansion of the ice formed by freezing of the water in the trap and consequently the pressure caused by said expansion breaks the trap at the point occupied by the water.

The object of the present invention is to provide a trap so constructed and shaped as to permit the ice formed from the water in the trap to expand upwardly and break without fracturing the trap.

Another object of the present invention is to provide a trap of this character which will be of as simple a construction as the traps now in general use.

With the foregoing objects outlined and with other objects in view, which will appear as the description proceeds, the invention consists in the novel features hereinafter described in detail, illustrated in the accompanying drawing and more particularly pointed out in the appended claims.

Referring to the drawing:—

Fig. 1 is a vertical longitudinal sectional view of a water closet bowl provided with my improved trap.

Fig. 2 is a transverse sectional view of the same taken on the line 2—2 of Fig. 1.

Fig. 3 is a longitudinal sectional view of a sink trap constructed in accordance with my invention.

Fig. 4 is a transverse sectional view taken on line 4—4 of Fig. 3.

In the drawing and particularly in the embodiment shown in Figs. 1 and 2, a water closet bowl is shown at 1, and this bowl is provided with a liquid sealed trap having an inlet passage way 2, an elbow 3, an outlet passage way 4 and a discharge conduit 5. The passage ways 2 and 4 are separated by a transversely extending vertical partition 6 having a narrow lower edge 7 which forms the upper wall of the elbow 3.

The entire wall or inner surface of the inlet passage way 2, with the exception of the portion formed by the partition 6, is inclined upwardly and outwardly at all points from the elbow 3 to the water line 8. The outlet passage way 4 also has its surface, with the exception of the portion formed by the partition 6, gradually inclined upwardly and outwardly from the elbow 3 to the water line 8.

It will, therefore, be seen that the inlet and outlet passage ways are of gradually increasing area or flared gradually upwardly from the elbow 3 to the water line, so that any ice formed by the freezing of the water in the trap, will be permitted to expand upwardly and will not cause the bowl to be cracked or fractured. As ice is formed in the trap and expansion of the same takes place, it will press against the edge 7 and this edge will function to shear the ice and prevent the same from rupturing the partition 6. The outlet passage way 4 and the discharge conduit 5 are separated by an inclined partition 9, the upper edge 10 of which determines the height of the water line 8 and the passage ways 2 and 4 are preferably flared slightly above the line 8 to insure upward expansion of the ice without fracture of the bowl.

In the form of my invention shown in Figs. 3 and 4, $1^a$ designates a sink trap constructed in accordance with my invention and including an inlet passage way $2^a$, an elbow $3^a$, an outlet passage way $4^a$ and a discharge conduit $5^a$. The passage ways $2^a$ and $4^a$ are separated by a vertical partition $6^a$ provided at its lower end with a straight shearing edge $7^a$. The inlet and outlet passage ways are gradually flared upwardly from the elbow $3^a$ to the water line $8^a$. In other words, the front and side walls of the passage way $2^a$ are gradually inclined upwardly and outwardly from the trap $3^a$ to a point adjacent to the water line $8^a$ and the side and rear walls of the passage way $4^a$ are also gradually inclined upwardly and outwardly from the elbow to the water line. The passage way $4^a$ and conduit $5^a$ are separated by a vertical partition $9^a$ having an upper edge $10^a$ which determines the water line.

The trap shown in Figs. 3 and 4 functions in the same manner as the one shown in Figs. 1 and 2 and further description of the operation is believed unnecessary.

It will be noted that the opposite side walls of the partitions 6 and 6ª are parallel, and it will also be noted that there are no parallel walls in either the passage way 2ª or the passage way 4ª. The idea in both modifications is to so form the inlet and outlet passage ways, that upward expansion of any ice formed in the trap will be facilitated without permitting the same to rupture the trap.

I am aware that various changes may be made in the shape and construction disclosed by the drawing without departing from the spirit of the invention, as disclosed in the following claims.

What I claim and desire to secure by Letters Patent is:—

1. A liquid sealed trap including a basin, inlet and outlet passageways having their lower ends connected to the ends of the basin, a vertical partition separating said passageways and having parallel side surfaces which extend from the basin to a position above the water line of the trap, the lower edge of said partition being relatively narrow and being arranged at the top of the basin, all of the inner surfaces of said passageways with the exception of the portions formed by said partition, being gradually inclined outwardly and upwardly from said basin to a line substantially coincident with the water line of the trap.

2. A liquid sealed trap including a basin, inlet and outlet passageways connected to the ends of the basin, a vertical partition separating said passageways and having parallel side surfaces which extend from the basin to a point above the water line of the trap, the lower edge of said partition being straight, relatively narrow and arranged at the top of the basin, a discharge conduit, and an inclined partition separating said discharge conduit from said outlet passageway, the upper edge of said inclined partition being arranged at an elevation higher than the lower edge of the other partition and determining the water line of the trap, and all of the inner surfaces of said passageways, with the exception of the portions formed by said vertical partition, being gradually inclined upwardly and outwardly from the basin to a point coincident with the upper edge of the inclined partition.

3. A liquid sealed trap including a basin, inlet and outlet passage ways connected to the ends of said basin, and a vertical partition separating said passage ways and provided at its lower edge with a relatively narrow portion designed to function as a shearing edge for breaking ice formed in the trap, all of the inner surfaces of said passage ways, with the exception of the portions formed by said partition, being inclined upwardly and outwardly from the basin to the water line of the trap.

GEORGE FRANCIS LYNDE.